(12) United States Patent
Elliott (10) Patent No.: US 7,672,778 B1
(45) Date of Patent: Mar. 2, 2010

(54) NAVIGATION SYSTEM WITH DOWNLOADED MAP DATA

(75) Inventor: Bryce Elliott, Naperville, IL (US)

(73) Assignee: Navteq North America, LLC, Chicago, IL (US)

( * ) Notice: Subject to any disclaimer, the term of this patent is extended or adjusted under 35 U.S.C. 154(b) by 884 days.

(21) Appl. No.: 10/894,980

(22) Filed: Jul. 20, 2004

(51) Int. Cl.
G01C 21/30 (2006.01)
G06G 7/00 (2006.01)

(52) U.S. Cl. .................. 701/209; 701/709; 701/201; 701/207; 701/102; 707/102

(58) Field of Classification Search .................. None
See application file for complete search history.

(56) References Cited

U.S. PATENT DOCUMENTS

| | | | |
|---|---|---|---|
| 5,513,110 A | 4/1996 | Fujita et al. | 364/449 |
| 5,953,722 A | 9/1999 | Lampert et al. | 707/100 |
| 5,968,109 A | 10/1999 | Israni et al. | 701/208 |
| 6,526,284 B1 | 2/2003 | Sharp et al. | 455/456 |
| 6,556,919 B2 | 4/2003 | Suzuki et al. | 701/208 |
| 6,591,270 B1 | 7/2003 | White | 707/101 |
| 6,640,187 B1 * | 10/2003 | Chenault et al. | 701/209 |
| 6,691,128 B2 * | 2/2004 | Natesan et al. | 707/102 |
| 6,711,497 B1 | 3/2004 | Winter et al. | 701/208 |
| 6,751,629 B2 | 6/2004 | White | 707/101 |
| 6,782,319 B1 | 8/2004 | McDonough | 701/208 |
| 7,146,273 B2 | 12/2006 | Kadono et al. | 701/208 |
| 7,203,597 B2 * | 4/2007 | Sato et al. | 701/207 |
| 2001/0051851 A1 | 12/2001 | Suzuki | 701/208 |
| 2003/0028316 A1 | 2/2003 | Miyahara | 701/208 |
| 2003/0045997 A1 | 3/2003 | Nakane | 701/202 |
| 2003/0229441 A1 * | 12/2003 | Pechatnikov et al. | 701/201 |
| 2004/0034469 A1 | 2/2004 | Kom | 701/208 |
| 2004/0044468 A1 | 3/2004 | Adachi | 701/208 |
| 2004/0117110 A1 | 6/2004 | Sasjima | 701/208 |
| 2004/0128068 A1 | 7/2004 | Chun | 701/208 |
| 2004/0167711 A1 | 8/2004 | Chen | 701/209 |
| 2004/0260458 A1 | 12/2004 | Park et al. | 701/200 |
| 2005/0033511 A1 * | 2/2005 | Pechatnikov et al. | 701/210 |

* cited by examiner

*Primary Examiner*—Khoi Tran
*Assistant Examiner*—Ian Jen
(74) *Attorney, Agent, or Firm*—Lisa M. Schdedel; Jon D. Shutter; Frank J. Kozak (57) ABSTRACT

A system and method are disclosed for providing geographic data to mobile units from a remotely located navigation-services provider. When a mobile unit requests route information, the navigation-services provider transmits an initial set of geographic data representing an area around a current position of the mobile unit. The navigation-services provider calculates a route to the destination and then identifies an intermediate exit point along the route that is located within the initial set of data. The mobile unit calculates an initial portion of the route to the intermediate exit point. The navigation-services provider determines a list of geographic-data groups needed to represent the remainder of the route and transmits this list to the mobile unit. Each geographic-data group is transmitted to the mobile unit along with an intermediate exit point. Using the received data, the mobile unit provides route guidance to a local end user.

18 Claims, 9 Drawing Sheets

NAVIGATION SYSTEM WITH DOWNLOADED MAP DATA

BACKGROUND OF THE INVENTION

The present invention relates to a system that provides navigation-related features to end users throughout a geographic region. More particularly, the present invention relates to a system that includes a centrally-located server that provides geographic data to end users' mobile units located throughout a serviced geographic region based on requests from the end users' mobile units.

Navigation systems provide various useful features, such as calculating routes to desired destinations, providing guidance for following calculated routes, displaying maps, and so on. There are various computer architectures for navigation systems that deliver navigation-related and map-related features. In one type of architecture for a navigation system, end users (such as vehicle drivers) have local mobile units that obtain geographic data from a remotely located geographic database and server. The remotely located geographic database contains a relatively large amount of geographic data. The server associated with the remotely located geographic database handles requests for navigation-related or map-related data from end users' local mobile units. When an end user's local mobile unit requests data, the server accesses the geographic database associated therewith to obtain the necessary data to respond to the request and then sends the data to the requesting end user's local mobile unit.

This type of navigation system architecture provides several advantages. One advantage relates to providing updated geographic data. There is a continuing need to update the geographic data used by navigation systems to reflect changes in the represented features. For example, new streets are built, road construction closes roads, detours are established, new businesses open, posted speed limits change, new turn restrictions are established at intersections, streets are renamed, and so on. These kinds of changes can affect travel through a geographic region. Accordingly, the geographic data used by a navigation system should be updated on a regular basis in order to accurately reflect changes in the represented geographic features. An architecture in which individual local navigation units obtain geographic data from a single geographic database affords an advantage with respect to the updating of the geographic data. With this type of system, updates need to be applied only to the central database.

Although there are advantages associated with a navigation system architecture in which individual local navigation units obtain data from a single geographic database associated with a central server, there are considerations that need to be addressed. One consideration relates to providing data to a large number of end users in a timely and efficient manner. Another consideration is that a relatively large amount of data may need to be transmitted to each user in order to provide features such as route calculation, route guidance and map display. This is especially the case if a sufficient amount of data representing features located in the vicinity of the user and along a route is provided to assist the user if he/she deviates from the calculated route. Thus, an efficient way is needed to transmit geographic data from a remotely located server to end users' mobile navigation units.

SUMMARY OF THE INVENTION

To address these and other objectives, the present invention comprises a system and method for providing geographic data to end users' mobile units from a remotely located navigation services provider so that navigation functions can be provided on the mobile units. While a user is operating a mobile unit to specify a destination for which route information is desired, an initial set of geographic data is downloaded from the remotely located navigation services provider to the mobile unit. The initial set of geographic data represents an area located around a current position of the mobile unit when specification of the destination is initiated. Once the destination has been specified, data indicating the destination is used by the remotely located navigation services provider to calculate a route to the destination. The navigation services provider provides data to the mobile unit that identifies one or more intermediate exit points along the route that are located within the initial set of geographic data downloaded to the mobile unit so that the mobile unit can calculate an initial portion of the route to the one or more intermediate exit points. The navigation services provider also determines a list that identifies the remaining groupings of geographic data needed to represent the route. The navigation services provider transmits this list to the mobile unit and then transmits each of the needed groupings of geographic data to the mobile unit. An intermediate exit point is identified for each grouping of data transmitted to the mobile unit. Using the geographic data received from the navigation services provider, the mobile unit provides guidance to the end user for following the route to the destination.

DETAILED DESCRIPTION OF THE PRESENTLY PREFERRED EMBODIMENTS

I. Overview of Navigation System

Figure 1:
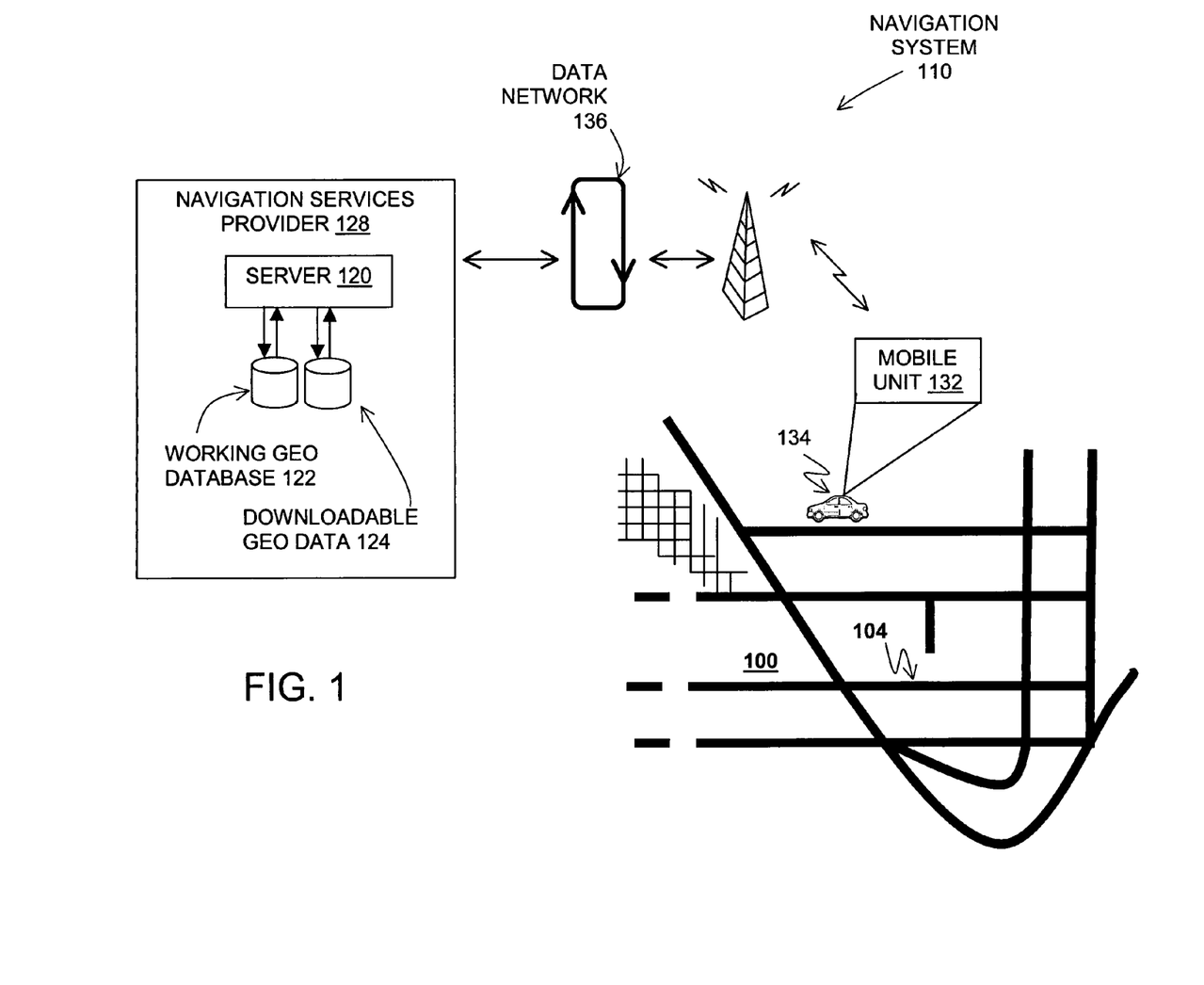
FIG. 1 is a diagram illustrating components of an embodiment of a navigation system that includes a centrally-located server that provides geographic data to an end user's mobile unit located in a serviced geographic region.

FIG. 1 shows a geographic region 100. The geographic region 100 may correspond to a metropolitan or rural area, a state, a country, or combinations thereof, or any other area of comparable size. Located in the geographic region 100 is a road network 104.

A navigation system 110 serves end users (e.g., vehicle drivers and passengers, as well as other persons) in the geographic region 100. The navigation system 110 is used by the end users to obtain navigation-related and/or map-related services with respect to the geographic region 100. The navigation-related and map-related services include information about travel along the road network 104, including route calculation and guidance, people and business finding services (e.g., electronic yellow and white pages), maps, point of interest searching, destination selection, and so on.

The navigation system 110 is a combination of hardware, software and data. The navigation system 110 includes remote components (i.e., hardware, software or data located at a central location remote from the end users) and local components (i.e., hardware, software, or data located physically with systems or units with each end user).

Included among the remote components of the navigation system 110 is a navigation services server 120. Associated with the navigation services server 120 is a working geographic database 122 and a data repository 124 that contains downloadable geographic data. The navigation services server 120, the working geographic database 122 and the downloadable geographic data storage repository 124 are maintained and operated by a navigation services provider 128 or other entity.

The local components of the navigation system 110 include the various computer platforms operated by the end users to request and obtain navigation-related and map-related features and geographic data from the navigation services provider 128. FIG. 1 shows a mobile unit 132, which is one of the computer platforms operated by an end user to obtain navigation-related or map-related services. In this embodiment, the mobile unit 132 is shown in a vehicle 134. Alternatively, mobile units may be located or installed in personal computers, personal organizers (e.g., PDAs), portable phones, or other types of computing devices that have the appropriate hardware and software to access the navigation services provider 128 over a data network 136. Although FIG. 1 shows only one mobile unit, it should be understood that there are many computing platforms, similar to the mobile unit, that operate as part of the navigation system.

The data network 136 enables two-way data communication between the mobile unit 132 and the navigation services provider 128. The network 136 may include a wireless portion and a land-based portion. The data network 136 may use any suitable technology and/or protocols that are currently available, as well as technology and/or protocols that become available in the future. The data network 136 may be part of, or connected to, the Internet.

II. The Navigation Services Provider

Figure 2:
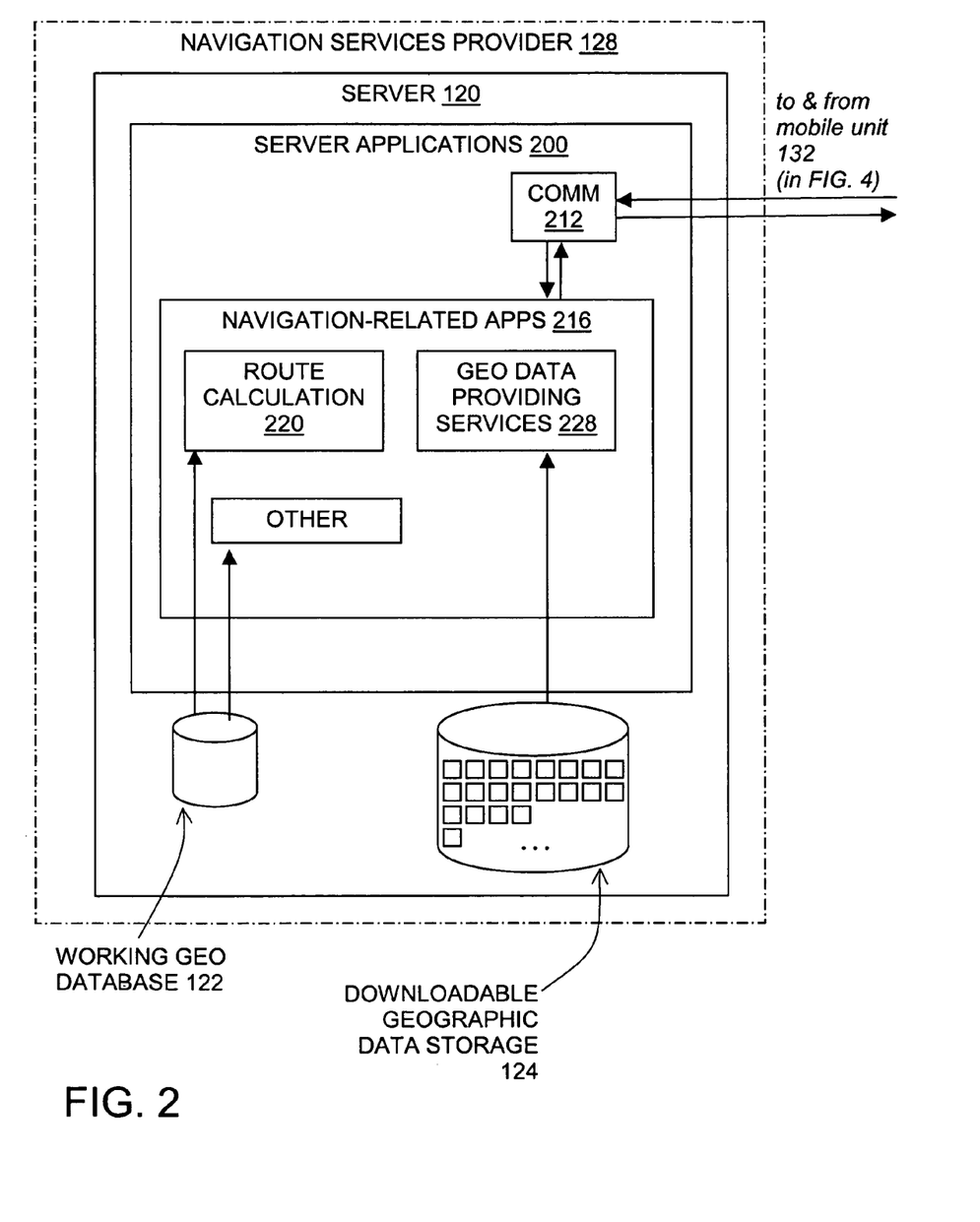
FIG. 2 is a block diagram showing components of the navigation services provider in FIG. 1.

FIG. 2 is a block diagram showing some of the components of the navigation services provider 128. Included on the server 120 of the navigation services provider 128 are server applications 200. One of the server applications 200 is a communications application 212. The communications application 212 interfaces with appropriate hardware and with the data network (136 in FIG. 1) in order to receive data from and send data to the mobile units used by the end users. The communications application 212 maintains and manages communications sessions with the end users.

Included among the server applications 200 are navigation-related applications 216. The navigation-related applications 216 use the working geographic database 122 associated with the navigation services server 120 in order to provide the various different types of navigation-related services. One of the navigation-related applications 126 is a route calculation application 220. Given data that identify the positions of an origin and destination, the route calculation application 220 calculates a route between the origin and the destination. The route calculation application 220 may use any of various means or algorithms now known or developed in the future for this purpose.

In order to provide navigation-related features, such as route calculation, data from the working geographic database 122 is used. The working geographic database 122 includes data representing the roads and intersections in the geographic region (100 in FIG. 1) and also includes information relating to the represented roads and intersections, such as turn restrictions at intersections, speed limits along the roads, street names of the various roads, address ranges along the roads, and so on. The working geographic database 122 also contains information about points of interest, businesses and other information. The working geographic database 122 may be organized to facilitate performing navigation-related functions.

Another of the navigation-related applications 216 on the navigation services server 120 is a geographic data providing application 228. In order to perform certain navigation-related functions locally on an end user's mobile unit 132, the mobile unit 132 requires geographic data. In a present embodiment, the end user's mobile unit 132 obtains the geographic data needed to perform certain navigation-related functions locally from the navigation services server 120. The data that the navigation services server 120 sends to the end user's mobile unit 132 are obtained from the downloadable geographic data storage 124. The geographic data providing application 228 on the navigation server 120 manages the provision of geographic data from the downloadable geographic data storage 124 to the end user's mobile unit 132.

The downloadable geographic data 124 are organized into groupings. The data contained in each grouping is determined spatially, i.e., the data in each grouping represents those geographic features that are contained in a separate, distinct one of a plurality of separate map tiles into which the entire represented geographic region (100 in FIG. 1) is divided.

Figure 3:
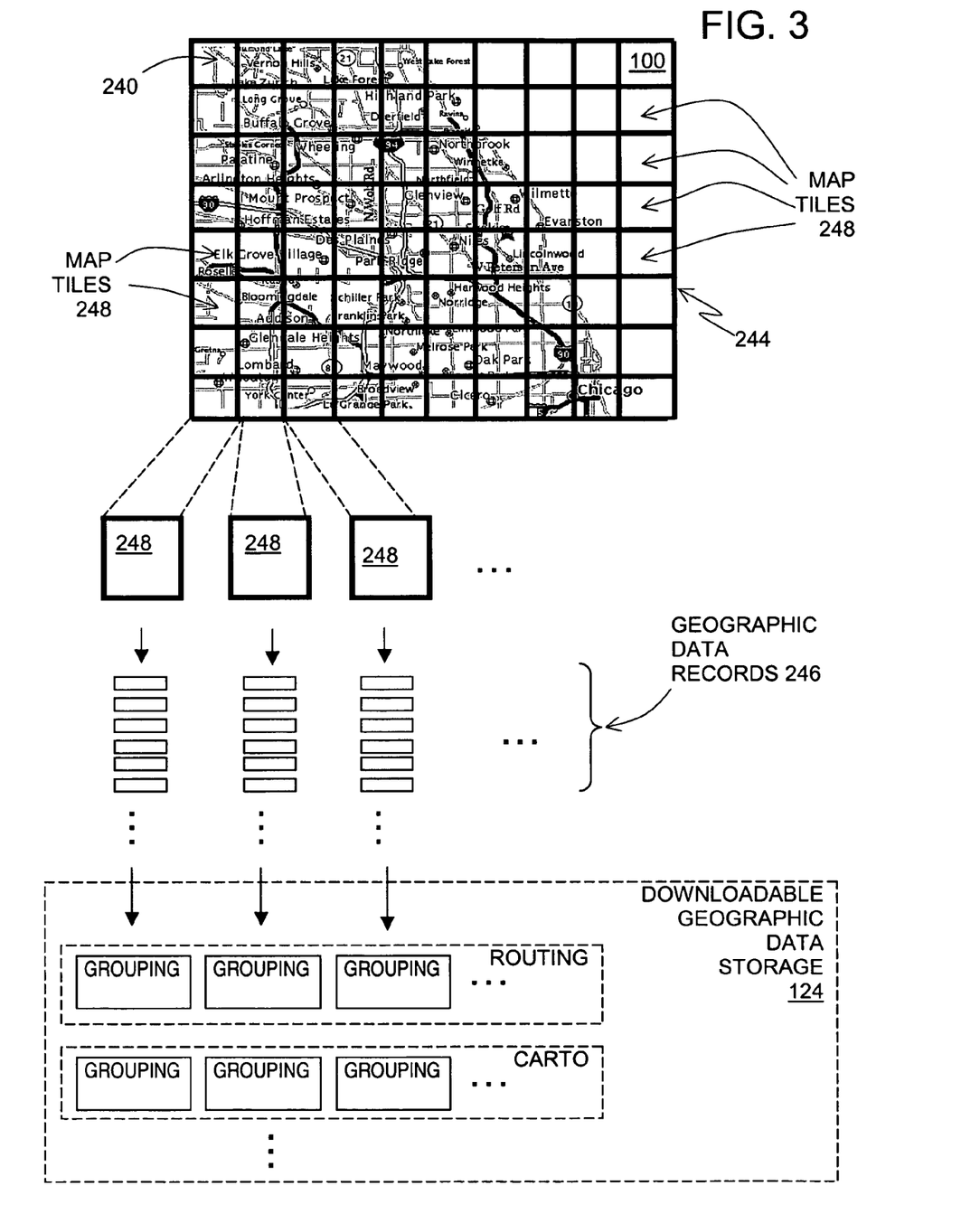
FIG. 3 illustrates how the downloadable geographic data in FIGS. 1 and 2 are organized by map tiles.

FIG. 3 illustrates how the downloadable map data 124 is organized. FIG. 3 shows a map 240 of the geographic region 100. In FIG. 3, a grid 244 overlays the map 240. The grid 244 is formed of grid lines that divide the represented geographic region 100 into a plurality of areas, or map tiles 248. The lines of the grid 244 represent the boundaries of the map tiles 248. In this embodiment, the map tiles 248 are rectangular; however, in alternative embodiments the map tiles 248 may have other shapes. In a present embodiment, these map tiles 248 all have the same dimensions, as shown in FIG. 3. In a present embodiment, the dimensions of a map tiles are approximately four miles square. In alternative embodiments, other dimensions may be used.

A grouping of data corresponding to a map tile contains a plurality of individual data records 246 that represent the geographic features that are encompassed within the map tile area 248. Thus, each separate grouping of data contains the data records 246 that represent the geographic features, such as the roads, intersections, points of interest, and other features, encompassed within a corresponding map tile area 248. All the map tile areas 248, taken together, make up the entire region 100.

In the downloadable data storage 124, the groupings corresponding to the map tiles are pre-computed. In other words, the determination and formation of each grouping are performed prior to any of the data in the downloaded data storage 124 being made available for downloading to the end users' mobile units 132.

The map tiles are numbered or otherwise associated with an index so that each map tile can be specifically identified. The numbering may be based on the geographic locations of the map tile areas.

The downloadable data storage 124 may include different types of geographic data. As explained in more detail below, there are different navigation-related and map-related functions that can be performed on the end users' mobile units using the geographic data downloaded from the navigation services provider. Performing different navigation- or map-related functions may be facilitated by organizing the geographic data into types based on the function to be performed. When geographic data is organized by type, each type includes the data attributes needed for performing a specific function, but may exclude attributes that are not needed for that function. As an example, routing data may include data that indicates which roads connect to each other, but may exclude data about street names or bodies of water, that are not needed for calculating routes. When downloading geographic data from the data storage 124 to the end users' mobile units, the geographic providing services application 228 may select the appropriate type of geographic data to be downloaded depending on the type of navigation- or map-related application being performed on the mobile unit. In addition, the geographic providing services application 228 may determine an appropriate order for downloading different types of geographic data to end users' mobile units, e.g., routing first, followed by cartographic. There may be various other alternatives.

When data are downloaded from the downloadable data storage 124 to the end user's mobile unit 132, the data are downloaded in whole groupings. This means that all the data records of a given type that represent geographic features encompassed within each map tile are downloaded together as a group to the end user's mobile unit so that all of the data records of that type that represent the geographic features located within the entire map tile area are available in the end user's mobile unit at the same time.

III. The Mobile Unit

As mentioned above, each end user uses a mobile unit (132 in FIG. 1) that obtains data from the navigation services provider 128. Some navigation-related functions are performed locally on the end user's mobile unit 132 using the data that is obtained from the navigation services provider 128.

Figure 4:
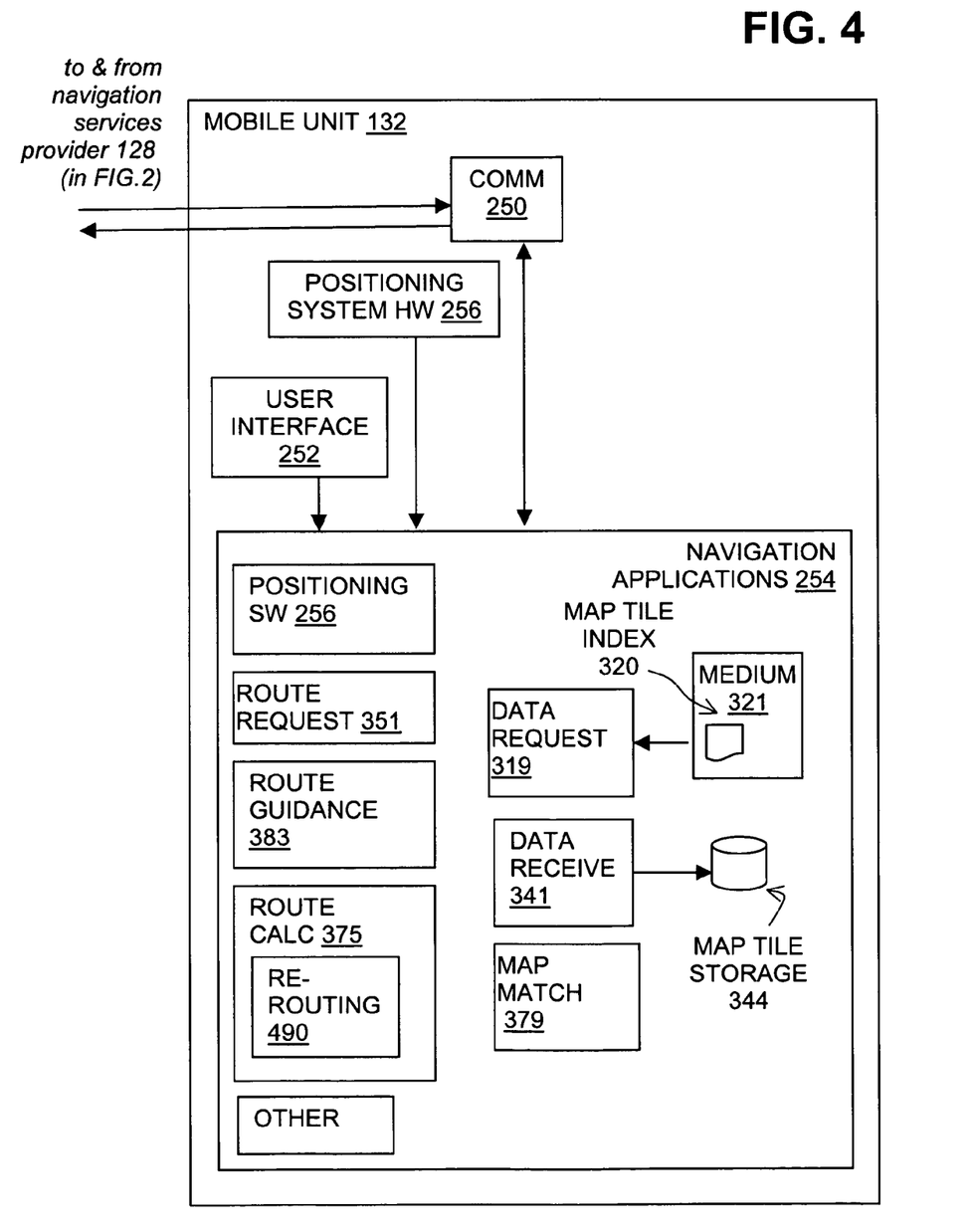
FIG. 4 is a block diagram showing components of the mobile unit in FIG. 1.

FIG. 4 shows a block diagram of some of the components of the mobile unit 132. The mobile unit 132 includes a communications system 250. The communications system 250 in the mobile unit 132 includes the hardware and software components needed to receive messages from and send messages to the navigation server (120 in FIG. 1) over the data network 136. The communications system 250 interfaces with other components in the mobile unit 132.

The mobile unit 132 also includes a user interface 252. The user interface 252 allows the end user to provide input to and receive information from the mobile unit 132. The user interface 252 includes hardware and software components. For example, the user interface 252 may include a display, a microphone, speakers, a keypad, or other kinds of means for inputting information into the computing platform and outputting information therefrom. The user interface 252 includes supporting software that may provide menus, prompts, audio, etc. The user interface 252 interfaces with other components in the mobile unit 132.

Included on the mobile unit 132 are navigation-related applications 254. The navigation-related applications 254 use the geographic data obtained from the navigation services provider 128 to provide various different types of navigation-related services or functions, such as route calculation and guidance, as explained further below.

The mobile unit 132 includes a positioning system 256. The positioning system 256 is a combination of hardware and software components. The positioning system 256 may use GPS, dead-reckoning, or a combination of these or other technologies to determine the location of the mobile unit.

IV. Operation

Figure 5A:
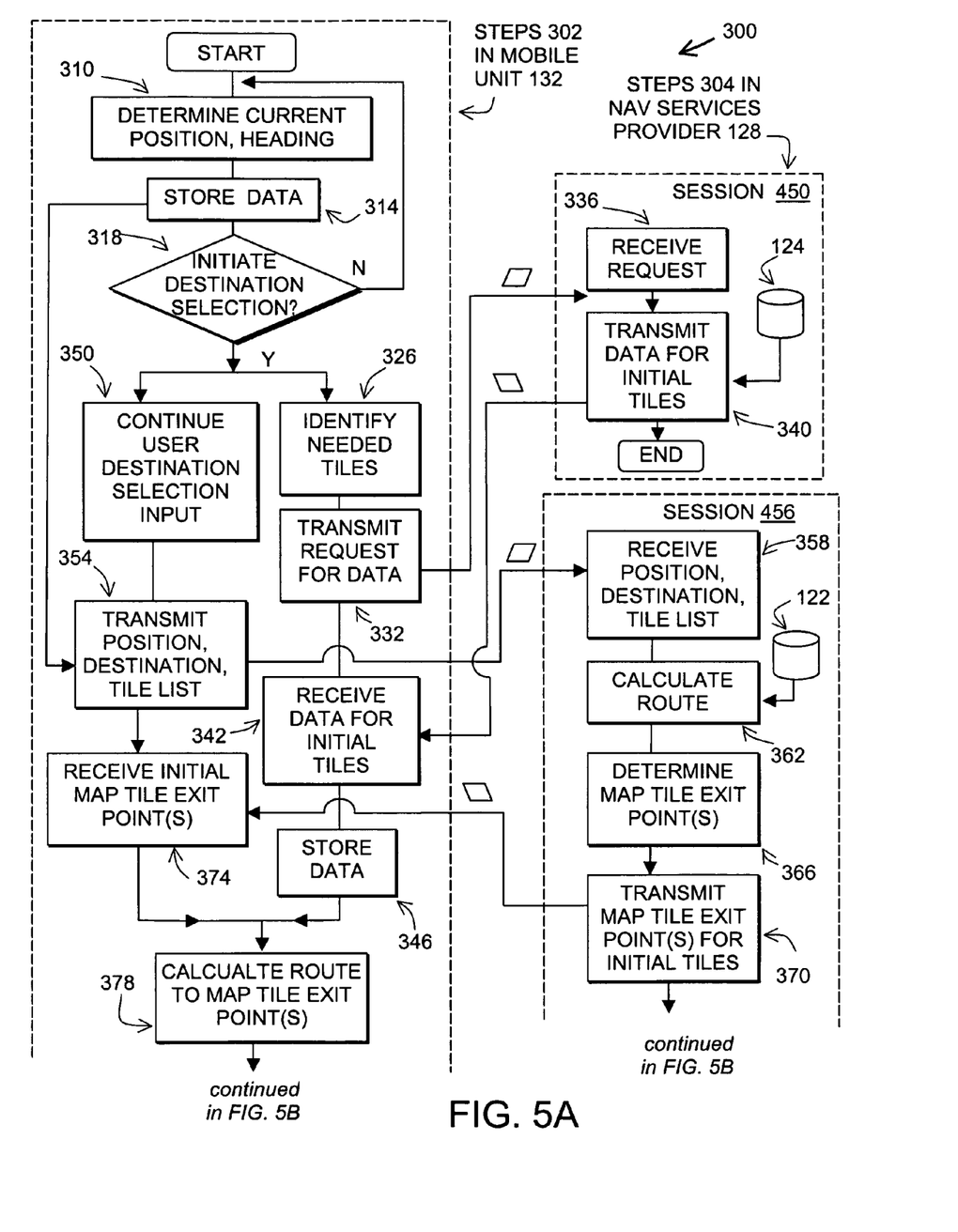
FIGS. 5A and 5B are a flowchart showing steps in a process performed by the navigation system of FIG. 1.
Figure 5B:
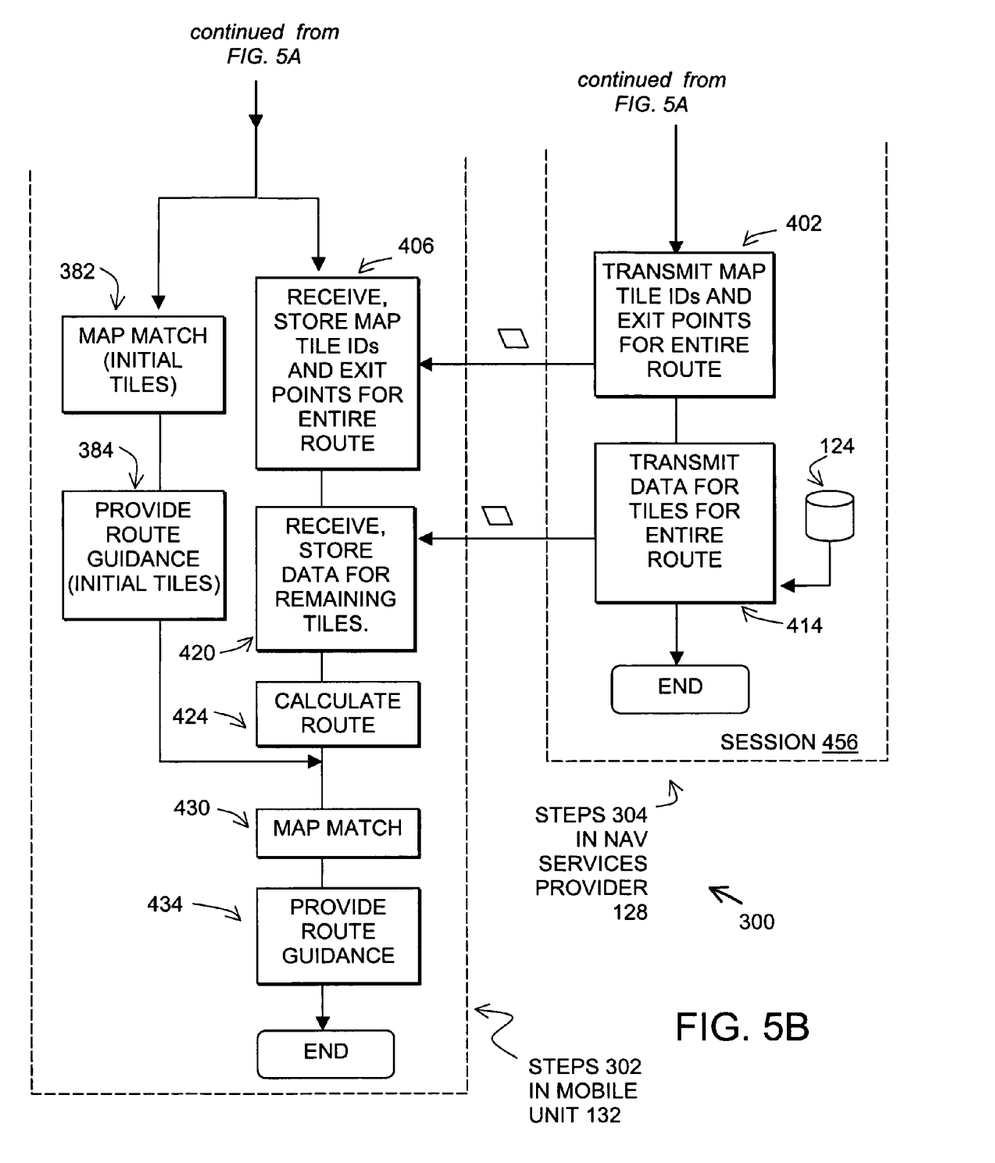

FIGS. 5A and 5B show a process 300 by which the mobile unit 132 can obtain geographic data in order to provide route information to a user for traveling to a destination. The process 300 includes steps 302 performed on the mobile unit 132 and steps 304 performed on the navigation services provider 128.

As the user is traveling along roads (104 in FIG. 1) in the geographic region (100 in FIG. 1), the positioning system (256 in FIG. 4) in the mobile unit 132 continues to determine the location of the mobile unit 132 (Step 310 in FIG. 5A). In this embodiment, the positioning system 256 also determines the heading of the mobile unit 132. The location may be expressed using geographic coordinates, although other suitable means or formats of geographic referencing may be used. The heading may be expressed in degrees although other suitable means of expressing direction may be used. The location and heading may be determined continuously, e.g., every second, every several seconds, or every fraction of a second, on a regular or irregular basis. Data indicating the current location and heading may be stored, at least temporarily, in a data storage medium in the mobile unit 132 (Step 314 in FIG. 5A).

Figure 6:
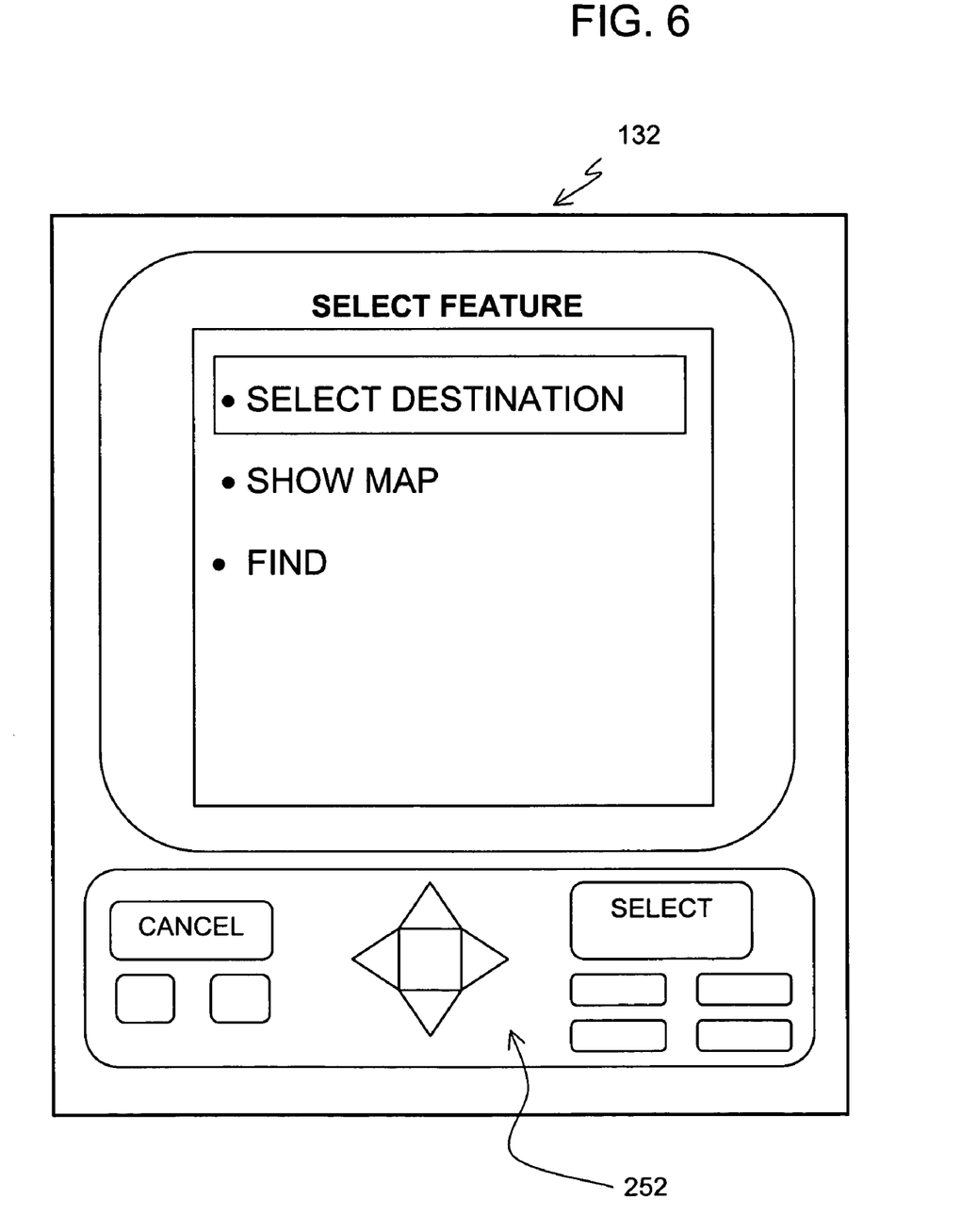
FIG. 6 is an illustration of a front panel of the mobile unit shown in FIG. 1.

The user operates the user interface 252 of the mobile unit 132 to obtain information about a route to a destination. Specifically, the user operates the user interface 252 to initiate the specifying of a desired destination (Step 318 in FIG. 5A). The user interface 252 may provide a menu, a keypad, buttons, a touch screen, speech recognition equipment, etc., that the user operates to initiate this function. FIG. 6 shows a front panel of the mobile unit 132 with a menu from which a user may initiate specification of a destination.

The mobile unit 132 may support several different ways to specify a desired destination. For example, the mobile unit 132 may allow a destination to be specified by street address, by selection of a facility type (e.g., restaurants, hotels, banks, etc.), by selection from a list of previous destinations, by selection from a list of favorite destinations, or by other means. The mobile unit 132 may present the user with a menu of different ways to select a desired destination.

Figure 7:
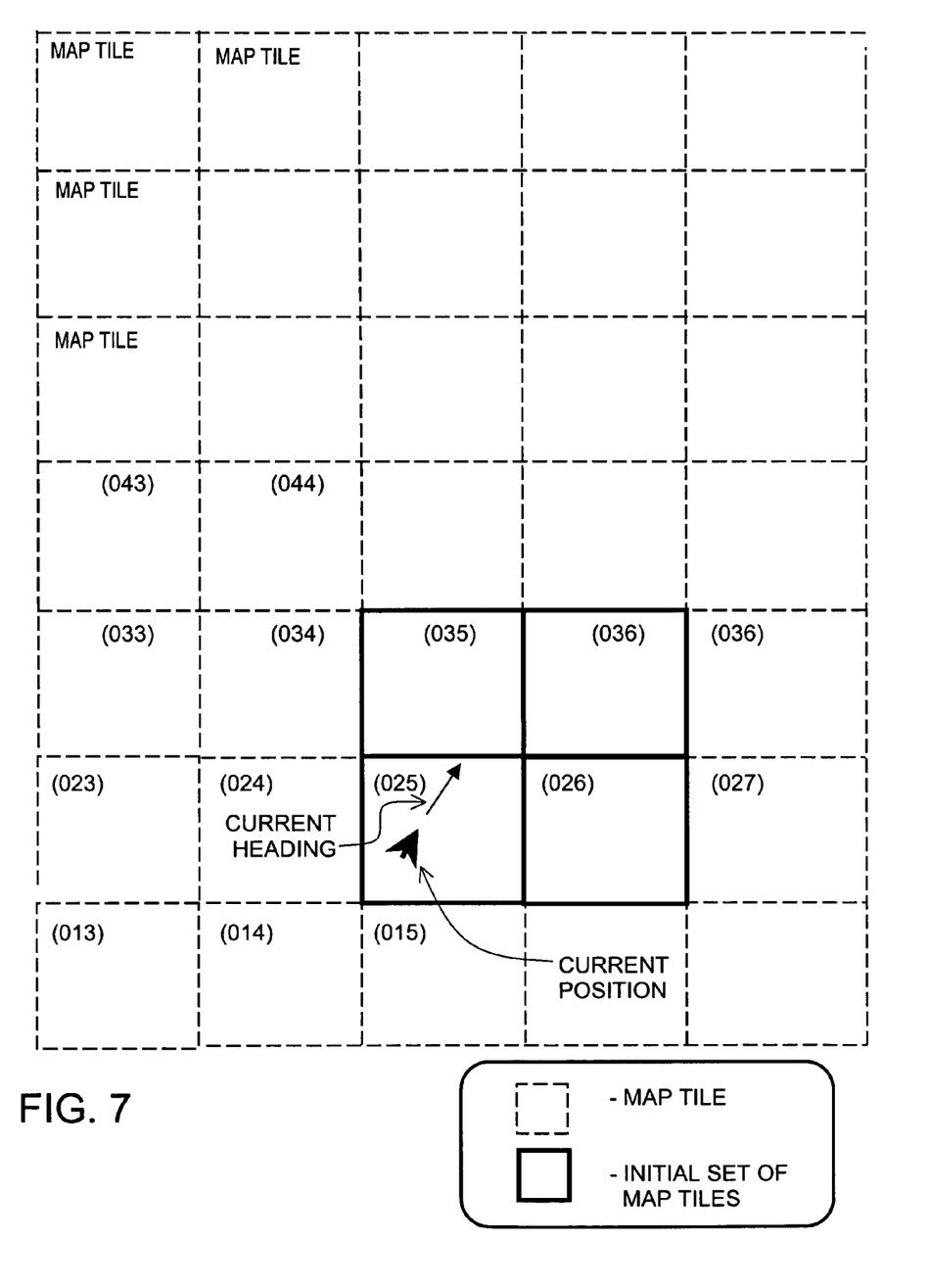
FIG. 7 is a diagram illustrating determination of the initial set of map tiles according to the process in FIGS. 5A and 5B.

When the user initiates the step of indicating a desired destination, a function (319 in FIG. 4) in the mobile unit 132 prepares to make a request to the navigation services provider 128 for data for an initial set of map tiles. The initial set of map tiles includes the map tile that encompasses the current position of the mobile unit 132 and those map tiles immediately ahead of the mobile unit 132. (This transmission, as well as other transmissions, is performed over the data network 136, which includes the wireless portion and the land-based portion.) In a present embodiment, the function 319 in the mobile unit 132 uses a tile index 320 to determine which map tiles to include in the initial request. In this embodiment, the tile index 320 is stored as data on a data storage medium 321 in the mobile unit. The tile index 320 indicates the locations of the geographic boundaries of each map tile in the geographic area and their associated IDs. The function 319 uses the data output from the positioning system 256 that indicates the location and heading of the mobile unit 132, along with the tile index 320, to determine in which map tile the mobile unit 132 is located, as well as which map tiles are immediately ahead of the mobile unit 132 (Step 326 in FIG. 5A). As an example, FIG. 7 shows the mobile unit 132 located at a current position along a road and illustrates the selection of a set of initial map tiles, labeled (025), (026), (035) and (036), for which data are to be requested. Once the initial set of map tiles are identified, the mobile unit 132 transmits a request for the data that represent the features in these map tiles to the navigation services provider 128 (Step 332 in FIG. 5A).

The initial request is received by the navigation services provider 128 (Step 336). The navigation services provider 128 responds to the initial request by transmitting the data for the initial set of map tiles to the mobile unit 132 (Step 340). A function (341 in FIG. 4) in the mobile unit 132 receives the data for the initial set of map tiles (Step 342). As the mobile unit 132 receives the data for the initial set of map tiles, it stores the data in a data storage device (344 in FIG. 4) and maintains a list of the map tiles for which data have been received (Step 346 in FIG. 5A).

While the function 319 in the mobile unit 132 is determining the initial set of map tiles, and transmitting the request for the data in the initial set of tiles and while the receiving function 341 begins to receive the data for the initial set of tiles, the user continues to operate the user interface 252 of the mobile unit to select a destination (Step 350). When the user has completed the selection of the destination, a function (351 in FIG. 4) in the mobile unit 132 transmits data indicating a new current position of the mobile unit, data indicating the destination, and data indicating the map tiles for which it has already requested data (so that the data for these tiles are not sent again) to the navigation services provider 128 (Step 354 in FIG. 5A).

The navigation services provider 128 receives the data indicating the new current position of the mobile unit 132, the destination, and the previous tile list (Step 358). The navigation services provider 128 calculates a route from the new current position to the destination (Step 362). The route calculation application (220 in FIG. 2) and the working geographic database 122 may be used for this purpose.

Figure 8:
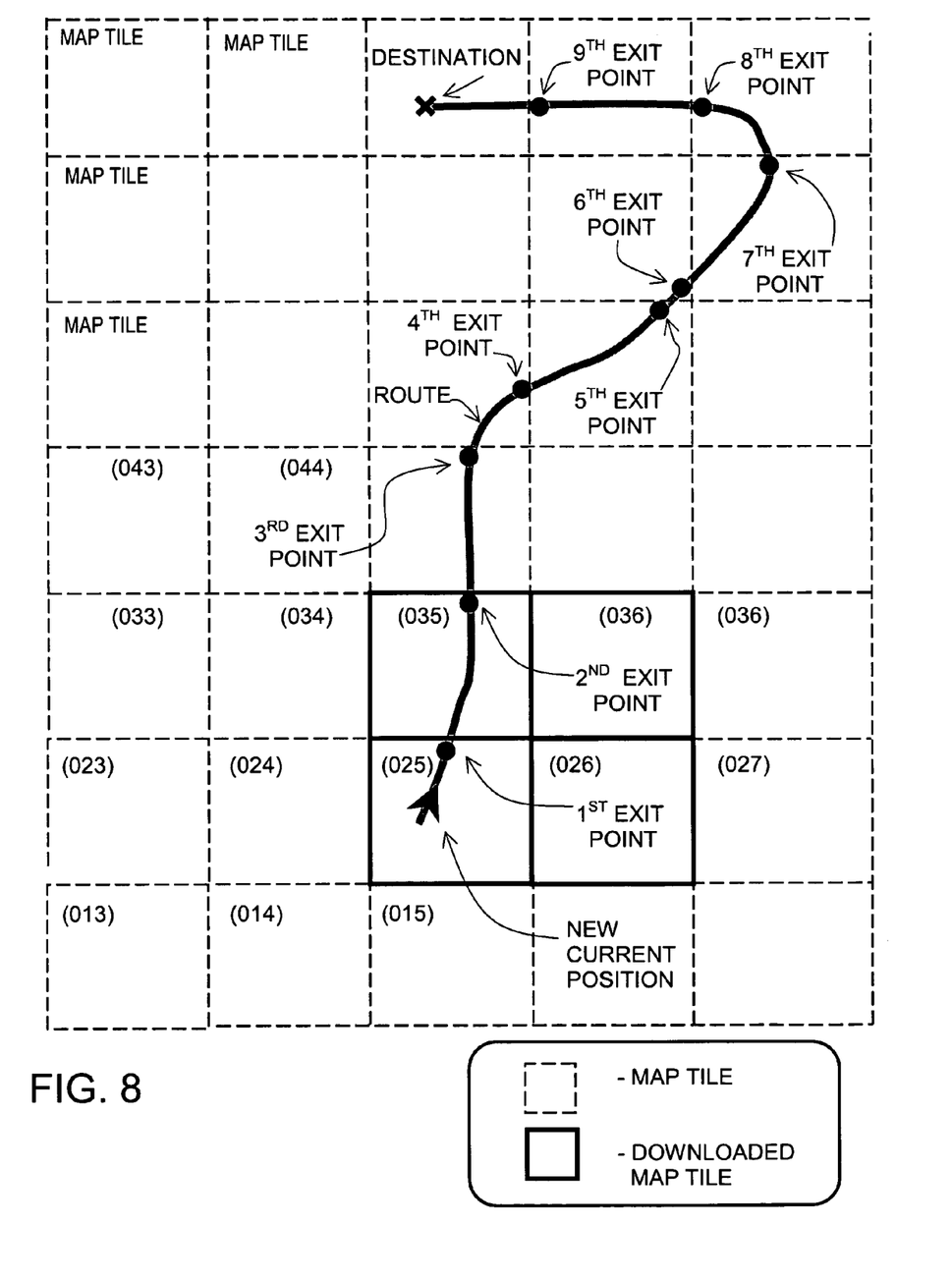
FIG. 8 is a diagram illustrating determination of the route and map tile exit points according to the process in FIGS. 5A and 5B.

As part of the route calculation process, the navigation services provider 128 determines one or more map tile exit points along the route (Step 366). The map tile exit point for a map tile is that point that is farthest along the route from the current position of the mobile unit while still being within the map tile. For example, the map tile exit point may be on the border of the map tile where the route leaves the map tile for another map tile. The navigation services provider 128 transmits data to the mobile unit 132 that indicates the map tile exit points for the initial set of map tiles (Step 370). FIG. 8 illustrates the locations of map tile exit points for the map tiles intersected by the route and for which data had been transmitted to the mobile unit 132.

The mobile unit 132 receives the data indicating the map tile exit points (Step 374 in FIG. 5A). A route calculation function (375 in FIG. 4) in the mobile unit 132 calculates a route from the current position of the mobile unit 132 to the farthest map tile exit point for which map tile data had been received from the navigation services provider 128 (Step 378 in FIG. 5A). As an example, referring to FIG. 8, if the mobile unit is located in the map tile labeled (025) and the data for both the initial map tiles (025) and (035) had already been received, the mobile unit would calculate a route to the $2^{nd}$ map tile exit point. On the other hand, if the data for the initial map tile (025) had already been received but all the data for the map tile (035) had not yet been received, the mobile unit would calculate a route to the $1^{st}$ map tile exit point. The mobile unit would then calculate a route from the $1^{st}$ map tile exit point to the $2^{nd}$ map tile exit point after all the data for the map tile (035) had been received.

The mobile unit 132 runs a map matching function (379 in FIG. 4) to determine the mobile unit's position relative to the downloaded data for the initial set of map tiles (Step 382 in FIG. 5B). Then, the mobile unit 132 runs a route guidance function (383 in FIG. 4) to provide guidance, such as maneuvering instructions, to the user via the user interface (Step 384 in FIG. 5B). The mobile unit continues to provide route guidance to the user as the user travels along the initial portion of the route.

If the destination is located within the set of initial map tiles that the mobile unit received from the navigation services provider 128, the mobile unit 132 can guide the user to the destination without obtaining additional data from the navigation services provider 128. However, if the destination is not located within the set of initial map tiles that the mobile unit 132 received from the navigation services provider 128, the navigation services provider 128 provides additional information to the mobile unit 132 so that the mobile unit can obtain the data needed to represent the calculated route.

Referring to FIG. 5B, the navigation services provider 128 transmits a list of map tile IDs for all the map tiles required to represent the entire calculated route and the exit point for each tile (Step 402). This is done so if communication is dropped while transferring tiles, the client only has to request the necessary tiles, the service provider does not have to calculate the route again. The map tile IDs on the list include the IDs for those map tiles intersected by the calculated route. In some embodiments, IDs of map tiles that do not actually intersect the calculated route but that are within a predetermined threshold distance from the calculated route are also included in the list. (The data in these close-to-the-route map tiles may be needed if the mobile unit deviates from the calculated route and needs the data representing the roads in these close-to-the-route map tiles for re-routing purposes.) In the present embodiment, the map tile IDs in the list are ordered to reflect the sequence by which the route intersects the tiles, i.e., the IDs of the map tiles for the earlier portions of the route are ahead of those IDs for map tiles for latter portions of the route. The mobile unit receives the list of map tile IDs and associated map tile points and stores the list and associated map tile points on a data storage medium (Step 406).

The navigation services provider 128 then transmits the data for the map tiles required to represent the route (Step 414). (The navigation services provider 128 may omit sending data for those map tiles for which the mobile unit has already received data, as indicated in the request for a route sent by the mobile unit in Step 354.) The mobile unit 132 receives the data for the map tiles required to represent the route (Step 420). The mobile unit 132 then calculates a route using the map tile data received from the navigation services provider 128 (Step 424). This route is calculated using, as the origin, the farthest map tile exit point of the initial set of map tiles. Thus, this route connects to the route previously calculated by the mobile unit using the data in the initial set of map tiles. If data for all the map tiles along the route have been received in the mobile unit sufficiently before the mobile unit leaves the area of the initial map tiles, the mobile unit calculates a route all the way to the destination.

The mobile unit 132 runs the map matching function (379 in FIG. 4) to determine the mobile unit's position relative to the data downloaded for the additional map tiles (Step 430 in FIG. 5B). Then, the mobile unit 132 runs the route guidance function (383 in FIG. 4) to provide guidance to the user for following the route (Step 434 in FIG. 5B). The mobile unit continues to provide route guidance to the user until the user reaches the destination.

Referring back to the route calculation step (Step 424), if the data for all the map tiles along the route to the destination has not yet been received in a sufficient amount of time before the mobile unit is to leave the area of the initial map tiles, the mobile unit calculates a route to the farthest map tile exit point along the route for which map tile data has already been received so that route guidance can be provided to the user when the mobile unit leaves the area of the initial map tiles. The mobile unit then calculates a route from this map tile exit point to the destination when the data for the remaining map tiles has been received.

Timing Considerations

Initial Set of Map Tiles

As explained above, the steps of requesting and obtaining data for an initial set of map tiles occurs in parallel with the step of receiving the user's input for specifying a destination. (Performing these steps in parallel means that some or all of the time it takes to perform the steps of requesting and obtaining data for an initial set of map tiles overlaps with the time it takes to receive the user's input for specifying a destination.) These steps can occur in parallel because the request for the data for the initial set of map tiles is made as soon as the user initiates the process of selecting a destination.

Performing these steps in parallel facilitates efficient operation of the navigation system. By performing these steps in parallel, a user of the mobile unit may experience little or no delay associated with the downloading of data from the navigation services provider. For example, while the user is still specifying a desired destination, the mobile unit has already requested the data for the initial set of map tiles and is already downloading the data for these tiles. In some cases, the amount of time required to request and obtain data for an initial set of map tiles may be approximately equal to or less than the amount of time required to receive the user's input for specifying a destination. The timing considerations are further explained as follows.

The initial set of map tiles needed by the mobile unit can be determined relatively quickly. These tiles can be determined quickly using the current position and heading of the mobile unit and the map tile index. Likewise, the transmission of the request for the data for the initial set of map tiles can occur relatively quickly. The downloading of the data for the initial set of map tiles is likely to take relatively longer. The time required to download the data for the initial set of map tiles depends on the amount of data involved and the bandwidth of the communications system. Depending on these factors, the time required to download the data for the initial set of map tiles may be approximately 30-40 seconds. However, compare the amount of time needed to download the data for the initial set of map tiles to the amount of time required by the user to specify a destination. Specifying a destination by entering a city, street, and street number, can easily take 40 seconds or more, especially if the city and street names have to be spelled out. Specifying a destination by selection of a category (e.g., "hotels") and then selecting a specific hotel from a list can also take 20-40 seconds or more. Even the specification of a destination by selecting it from a list of previous or favorite destinations may take 10-15 seconds or more. Thus, by the time the user finishes specifying the destination, it is possible that some or all the data for the initial set of map tiles has already been downloaded.

Once the user has specified the destination, there is still an amount of time required to calculate a route to the destination. Relatively little data is needed to indicate the destination. Therefore, transmitting the data indicating the destination from the mobile unit to the navigation service provider will take relatively little time. The navigation services provider can calculate a route to the specified destination relatively quickly because it can use relatively fast computing resources for this purpose. Identifying the map tile exit points can be performed as a part of the route calculation process thereby adding little or no extra time to the process. Because relatively little data is needed to indicate the map tile exit points, transmitting data indicating these points from the navigation services provider to the mobile unit likewise will take a relatively small amount of time. Once the mobile unit receives the data indicating the map tile ID's and exit points for the initial set of map tiles, the mobile unit calculates a route from the mobile unit's current position to the farthest map tile exit point from among those map tiles for which it has already received map data. Because each of the map tiles is relatively small, this route calculation process can be performed relatively quickly on the mobile unit.

Timing Considerations

Map Tiles for Entire Route

In FIGS. 5A and 5B, the step of sending the map tile exit points for the initial set of map tiles (Step 370), the step of transmitting a list of map tile IDs for the entire route and identifying the exit points (Step 402) and the step of transmitting the data for the map tiles (Step 414) are shown as separate steps. However, in a present embodiment, all this data can be sent from the navigation services provider to the mobile unit as parts of one message, i.e., in one communications session. The steps are shown separately to illustrate the sequence in which the data in the message is organized. In a present embodiment, data identifying the map tile exit points are sent first, so that route calculation and guidance for the initial portion of the route can be started as soon as possible. Data identifying all the map tiles and exit points needed for the route is sent next so that the mobile unit can request the data needed for the map tiles if the connection with the server is interrupted before all the data for all the map tiles for the entire route is received. Finally, the data for all the map tiles along the route is sent, in order by map tile, so that the data for the map tiles at the beginning of the route are sent before the data for the map tiles at the end of the route.

Statelessness

An embodiment of the navigation system described above has the advantage that the navigation server's operation can be stateless. This means that the navigation server does not have to keep track of a large number of users and/or the states of each user. Referring to FIGS. 5A and 5B, the operations of the navigation server when responding to requests from the end users' mobile devices can be separated into discrete independent sessions. In one session, labeled 450 in FIG. 5A, the navigation server receives a request for the data for an initial set of map tiles and responds to the request with the requested data. In another session, labeled 456 in FIGS. 5A and 5B, the navigation server receives a request for data for a route, i.e., an origin and destination, along with the IDs for the initial map tiles (Step 358 in FIG. 5A), to which a response is sent that includes the map tile list, the map tile data, and the map tile exit points. These two sessions can be entirely independent of each other. The navigation server is not required to keep track that data for a set of initial map tiles had been previously sent to the user in order to respond to the user's request for data for a route.

V. Alternatives

In the embodiment disclosed above, it was described that the map tiles used to organize the geographic data all have the same dimensions. In alternative embodiments, the map tiles used to organize the geographic data may have different dimensions. If map tiles with different dimensions are used, appropriate adjustments may be made to the function in the mobile unit that determines the initial set of tiles.

Another function that may be provided in the mobile unit is a re-routing function. In FIG. 4, a re-routing function 490 is shown among the navigation applications 254 in the mobile unit 132. A user being guided along a route to a destination may depart from the calculated route. This may occur intentionally or inadvertently. When this occurs, the user may want to have the mobile unit determine that he/she has departed from the calculated route and provide new guidance for either returning to the original route or finding a new route to the original destination. Because the mobile unit has downloaded data for the entire map tile area in which the mobile unit is located as well as data for additional map tile areas along a route, the map matching function (379 in FIG. 4) in the mobile unit can determine whether the mobile unit has deviated from a calculated route. If this has occurred, the re-routing function 490 can perform a re-routing back to the original route or find a new route to the destination.

There are various ways to determine the initial set of map tiles. One way to determine the initial set of map tiles is to define a corridor. For example, a corridor may be defined from the current position of the mobile unit extending 1 mile on either side of a line 4 miles along the heading from the current position of the mobile unit. There are various other ways to determine the initial set of tiles.

When downloading the initial set of tiles, priority is given to the map tile in which the mobile unit is located. In this way, map matching of the mobile unit to the downloaded map data can occur as soon as possible.

In one of the embodiments described above, it was stated that the initial set of map tiles for which data is needed by a mobile unit was determined by a function in the mobile unit using a map tile index located in the mobile unit. In an alternative embodiment, the function that determines the initial set of map tiles could be located in the navigation services provider so that the determination of the initial set of map tiles is made by the navigation services provider. According to this alternative, the mobile unit transmits data indicating its current position and heading to the navigation services provider. When the navigation services provider receives this information from the mobile unit, it operates a function that determines the initial set of map tiles needed by the mobile unit based on its current position and heading.

In one of the embodiments disclosed above, it was stated that the identification of the initial set of map tiles for which data is needed by a mobile unit was determined at the time a user initiates the process of specifying a destination by operating the user interface. This does not mean that the mobile unit necessarily waits until the destination selection process is initiated to identify the initial set of map tiles. In one mode of operation, the mobile unit continuously (e.g., regularly, periodically or non-periodically) performs this operation as a background process and stores data identifying the IDs of a potential initial set of map tiles that would be needed if the user were to initiate the destination selection process at that time. This background process is continued until the user actually operates the user interface to initiate the destination selection process at which time the most recently stored IDs of a set of potential initial map tiles is retrieved from temporary storage and transmitted to the navigation services provider.

It was stated above that the navigation services provider may store different types of map data (e.g., routing, cartographic) for downloading to end users' mobile units. If an end user's mobile unit provides different types of navigation-related functions that use different types of geographic data, it may be preferable to download all the data of one type map first and then the data for another type. For example, it may be preferable to download all the routing data needed for calculating a route to the destination first and then download the cartographic data needed for displaying maps afterward.

According to another alternative embodiment, after the navigation services provider calculates a route to a destination, the navigation services provider transmits data to the end user's mobile unit that identifies each specific road segment (link) in the calculated route. This route data would be in addition to the data for the map tiles that intersect the route. The route data would identify each specific road segment by data record ID (e.g., link ID). If route data is transmitted from the navigation services provider, the mobile unit would not have to perform the route calculation function locally. Further, if route data is transmitted from the navigation services provider, the navigation services provider would not have to identify the map tile exit points (at least for those map tiles beyond the initial set of map tiles) because identifying the specific road segments in a route leads to the map tile exit points anyway.

It is intended that the foregoing detailed description be regarded as illustrative rather than limiting and that it is understood that the following claims including all equivalents are intended to define the scope of the invention.

I claim:

1. A method of operation for a navigation system that includes a mobile unit and a server located remotely from the mobile unit, wherein the mobile unit obtains geographic data by requesting the geographic data from the remotely located server, the method comprising the steps of:

prior to transmitting data that indicates a destination to the server, downloading an initial set of geographic data from the server to the mobile unit, wherein the initial set of geographic data represents an area located around a current position of the mobile unit while a user is operating the mobile unit to specify the destination;

transmitting the data that indicates the destination to the server;

if the destination is not located within the area represented by the initial set of geographic data, receiving data from the server in the mobile unit that indicates an intermediate location located within the area represented by the initial set of geographic data, wherein the intermediate location is located along a route to the destination calculated by the server;

on the mobile unit, calculating a route to travel to the intermediate location; and downloading additional geographic data from the server, wherein the additional geographic data represents an area from the intermediate location to the destination.

2. The method of claim 1 further comprising:
after the step of calculating the route to travel to the intermediate location, providing guidance to the user for traveling to the intermediate location.

3. The method of claim 1 further comprising:
prior to downloading the initial set of map data, determining a current position of the mobile unit; and
determining one or more map tile areas around the current position of the mobile unit,
wherein the initial set of geographic data represents geographic features located within the one or more map tile areas around the current position of the mobile unit.

4. The method of claim 3 wherein the map tile areas divide a geographic region into a plurality of non-overlapping areas.

5. The method of claim 4 wherein the map tile areas all have the same dimensions.

6. The method of claim 3 wherein the intermediate location is a map tile exit point that corresponds to a location located in one of the map tile areas where the route calculated by the server exits the one of the map tile areas.

7. The method of claim 3 wherein the step of determining one or more map tile areas around the current position of the mobile unit is performed by a function in the mobile unit.

8. The method of claim 1 wherein operation of the server is stateless.

9. The method of claim 1 wherein the user operates the mobile unit to specify the destination by entering an address.

10. The method of claim 1 further comprising:
prior to downloading the initial set of map data, determining a current position and heading of the mobile unit; and
determining one or more map tile areas around the current position of the mobile unit,
wherein the initial set of geographic data represents geographic features located within the one or more map tile areas around the current position of the mobile unit in a direction of the heading.

11. A method of operation for a navigation system that includes mobile units and a server located remotely from the mobile units, wherein the mobile units obtain geographic data by requesting the geographic data from the remotely located server, the method comprising the steps of:
on the server, upon receiving a first type of request from a mobile unit that indicates that the mobile unit will send a second type of request that identifies a destination, transmitting an initial set of map data to the mobile unit, wherein the initial set of map data represents geographic features located around a current position of the mobile unit; and
on the server, upon receiving the second type of request from a mobile unit that identifies an origin, the destination, and an area for which data had previously been obtained, calculating a route from the origin to the destination, identifying an intermediate exit point located in the area for which data had previously been obtained wherein the exit point is located along the route, transmitting data to the mobile unit that indicates the exit point, and transmitting map data covering a remaining portion of the route to the destination from the area for which data had previously been obtained.

12. The method of claim 11 wherein the second type of request is received from a mobile unit that had previously made the first type of request.

13. The method of claim 11 wherein the first type of request and the second type of request are received from different ones of the mobile units.

14. The method of claim 11 wherein the server, upon receiving the second type of request, also transmits data indicating an exit point for each area for which a separate grouping of map data covering the route to the destination is transmitted, wherein the exit point is located along the calculated route within the associated area associated with a separate grouping of map data.

15. A method of operation for a navigation system that includes a mobile unit and a server located remotely from the mobile unit, wherein the mobile unit obtains geographic data by requesting the geographic data from the remotely located server, wherein the geographic data is organized into groupings based on a plurality of map tiles, wherein each of the map tiles corresponds to a separate one of a plurality of geographic areas into which a geographic region is divided, the method comprising:
on the mobile unit, continuing to determine a current position of the mobile unit;
accepting from a user of the mobile unit an indication of an intent to request a route to a destination;
taking into account the current position and the indication of an intent, transmitting from the remotely located server to the mobile unit the geographic data that corresponds to a first set of map tiles, wherein the first set of map tiles corresponds to those map tiles immediately around the current position of the mobile unit;
after transmitting the first set of map tiles, accepting from the user an indication of the destination;
on the remotely located server, calculating a route to the destination;
transmitting from the server to the mobile unit data indicating a first intermediate point along the route, wherein the first intermediate point is located within one of the first set of map tiles;
on the mobile unit, calculating a route from a new current position to the first intermediate point using the data corresponding to the first set of map tiles that had been transmitted from the remotely located server, wherein the route calculated on the mobile unit does not include the destination;
as the mobile unit progresses toward the destination, transmitting from the remotely located server to the mobile unit additional geographic data that corresponds to one or more additional map tiles, wherein the one or more additional map tiles correspond to a subsequent portion of the route beyond that portion located within the first set of map tiles,
transmitting from the server to the mobile unit data indicating a subsequent intermediate point along the route, wherein the subsequent intermediate point is located within the one or more additional map tiles; and
on the mobile unit, calculating a route from a subsequent new current position to the subsequent intermediate point using the data corresponding to the one or more additional map tiles that had been transmitted from the remotely located server.

16. A method of operation for a mobile unit in a navigation system, the mobile unit communicating with a server located remotely from the mobile unit, wherein the mobile unit obtains geographic data by requesting the geographic data from the remotely located server, the method comprising:
selecting a feature from a user interface of the mobile unit, wherein the selection indicates a desire to specify a destination;
prior to specifying the destination, receiving from the server an initial portion of map data, the initial portion not including the destination;

receiving from the server data representing an exit point, the exit point in the initial portion of map data;
calculating a route to the exit point;
receiving from the server a final portion of map data after specifying the destination, the final portion comprising the destination; and
calculating a route to the destination.

17. The method of claim 16 further comprising:
after calculating a route to the exit point, providing guidance to a user of the mobile unit for traveling to the exit point.

18. The method of claim 16 further comprising:
receiving from the server at least one intermediate portion of map data;
for each received intermediate portion of map data, receiving from the server data representing an intermediate exit point, the intermediate exit point in the intermediate portion of map data; and
for each intermediate exit point, calculating a route to the intermediate exit point.

* * * * *